United States Patent [19]
Bruck et al.

[11] Patent Number: 6,088,330
[45] Date of Patent: Jul. 11, 2000

[54] RELIABLE ARRAY OF DISTRIBUTED COMPUTING NODES

[76] Inventors: Joshua Bruck, 5657 Bramblewood Rd., La Canada, Calif. 91011; Vasken Bohossian, 11675 Lavigne app. 6, Montreal PO, Canada, H4J-1X4; Chenggong Fan, 156 S. Meridith Ave., Apt. 115; Paul LeMahieu, 1032 E. Del Mar Blvd., Apt. 301, both of Pasadena, Calif. 91106; Marcus David Daniel Riedel, 1015 Strauss, Brossard Quebec, Canada, J4X 1T2; Lihao Xu, 307 S. Wilson Ave., Apt. 5, Pasadena, Calif. 91106

[21] Appl. No.: 08/943,049

[22] Filed: Oct. 1, 1997

Related U.S. Application Data

[63] Continuation of application No. 08/926,624, Sep. 9, 1997, abandoned.

[51] Int. Cl.[7] ................................ H04J 1/16; H04J 3/14; H04L 1/00; H04L 12/26
[52] U.S. Cl. .................... 370/228; 709/201; 709/217; 709/224; 714/31; 711/114; 348/13
[58] Field of Search ................................ 709/217–9, 223, 709/224, 201; 370/242–4, 216–7, 221–228; 711/114, 127, 162; 348/13, 12, 7; 455/5.1, 4.2; 714/30, 31

[56] References Cited

U.S. PATENT DOCUMENTS

| | | | |
|---|---|---|---|
| 5,361,347 | 11/1994 | Glider et al. | 395/575 |
| 5,388,243 | 2/1995 | Glider et al. | 395/425 |
| 5,412,661 | 5/1995 | Hao et al. | 371/10 |
| 5,475,697 | 12/1995 | Katz et al. | 395/486 |
| 5,579,475 | 11/1996 | Blaum et al. | 395/182 |
| 5,612,897 | 3/1997 | Rege | 364/514 |
| 5,630,007 | 5/1997 | Kobayashi et al. | 386/113 |
| 5,768,623 | 6/1998 | Judd et al. | 395/857 |
| 5,867,640 | 2/1999 | Aguilar et al. | 395/182.04 |
| 5,872,904 | 2/1999 | McMillen et al. | 395/182.02 |
| 5,899,582 | 5/1999 | DuLac | 386/125 |

FOREIGN PATENT DOCUMENTS

| | | | |
|---|---|---|---|
| PCT/US91/01256 | 9/1991 | WIPO | G06F 13/12 |

OTHER PUBLICATIONS

N. J. Boden et al., "Myrinet: A Gigabit–per–Second Local Area Network", Feb. 15, 1995, *IEEE Micro*, pp. 29–36.

A. Cohen et al., "Segmented Information Dispersal (SID) for fault–tolerant video servers", *SPIE*, 1996, vol. 2604, pp. 58–69.

S. Nakamura et al., "Distributed RAID Style Video Server", Aug. 1996, *IEICE Trans Commun.*, vol. E79–B, No. 8, pp. 1030–1038.

R. Tewari et al., "High Availability in Clustered Multimedia Servers", Feb. 26, 1996, *IEEE*, pp. 645–654.

P.C. Wong et al., "Redundant Array of Inexpensive Servers (RAIS) for On–demand Multimedia Services", Aug. 6, 1997, *IEEE*, pp. 787–792.

M. M. Buddhikot et al., "Design of a large scale multimedia storage server", Dec. 1994, *Computer Networks and ISDN Systems*, pp. 503–517.

*Primary Examiner*—Chau Nguyen
*Assistant Examiner*—David R Vincent
*Attorney, Agent, or Firm*—Heller Herman White & McAuliffe

[57] ABSTRACT

A system which uses redundant storage and redundant communication to provide a robust distributed server system.

26 Claims, 13 Drawing Sheets

= computer
= switch

= computer
= switch

= computer
= switch

| General problem |
|---|
| Setting: a network of switches and nodes.<br>Goal: node to node communication.<br>Fault: switch, node or link failure. |

| Specific problem |
|---|
| Setting: switches forward packets, nodes do not.<br>Goal: constant number of isolated nodes.<br>Fault: switch failure. |

Example 1 An array code of 5 × 5
The first parity row is calculated along the diagonals of slope −1, with the last row being only an imaginary 0-row, as follows:

The second parity row is calculated along the diagonals of slope +1, as follows:

Then the complete codeword is:

FIG. 14E

RELIABLE ARRAY OF DISTRIBUTED COMPUTING NODES

This application is a continuation of application Ser. No. 08/926,624 filed Sep. 9, 1997, now abandoned.

BACKGROUND

This application describes a reliable array of distributed computing nodes forming a network which includes redundant communication and storage of information in a way to form robust communications and distributed read and write operations. The system may also use detection of a condition which indicates the need for redundancy, and reconfiguration in response to the condition in order to compensate for the condition.

Computing and storage over a distributed environment has a great potential of leveraging existing hardware and software.

Such a system would find use as a distributed and highly available storage server. Possible applications include use as multimedia servers, web servers, and database servers. More generally, however, a system of this type can be used for any application where information needs to be distributed among locations.

The challenge, however, is the proper mix of connections, monitoring and operation which allows reliability without excessively increasing the cost.

It is known how to provide redundant storage systems which can compensate for certain faults. One example of such a system is the so-called reliable array of independent disks or "RAID". Two examples of the RAID type system are found in U.S. Pat. Nos. 5,579,475, and 5,412,661. These systems provide redundant data storage, so that failure of any disk of the system will be compensated by redundant data elsewhere in the system.

Communication systems are known in which each computer in the system ("node") is connected with the other nodes. One example is Ethernet, which is a bus-based protocol. The computing nodes communicate via the bus. A server typically stores all of the shared data for all the nodes. The nodes may also have local data storage.

A single network system includes a single Ethernet link between the nodes and the server. Therefore, if any fault occurs in the connection or in the communication to the server, or in the server itself, the nodes may no longer be able to obtain conventional data access services from the server. The nodes are then forced to operate in stand alone mode. Those nodes can then only operate using data which is available locally.

Server based systems which attempt to increase the reliability of such a system are known. One such system uses a dual bus connection. Each computing node is provided with two Ethernet connections, using two separate Ethernet cards, to two separate buses to two separate servers. This is effectively two separate systems, each having its full complement of hardware and storage.

If either connection or bus has an error, normal operation can still continue over the other bus. A system with two redundant buses and two redundant servers is called dual bus, dual server. Such a dual bus, dual server system will tolerate any single network fault. However, such systems usually require that all information be duplicated on each server.

SUMMARY OF THE INVENTION

The system described in this application leverages existing hardware and software by using relatively low power workstations, such as personal computers. These personal computers are connected by a redundant connection. The connection can use existing hardware, e.g. local and/or wide area networks.

The present application describes a redundant distributed server formed from an array of distributed computing nodes. Each of the computing nodes stores information in a special redundant way, and also runs a protocol ensuring robust communication.

The system includes a special architecture and operation which allows fault tolerance in the network, preferably such that some specific number of network faults will not affect the operation of the remaining nodes of the system. However, no single one of the nodes should duplicate the storage of all of the information.

The server system includes redundant communication and storage. The redundant communication is obtained from a system architecture allowing each node to communicate to each other node over one of at least two different paths. The redundant storage is obtained from redundant storage of the information using a special redundant coding scheme.

The server system also runs a distributed detection routine which detects system functional states. One system functional state, for example is a network fault. The network fault can include a communication fault such as a broken link, or an inoperable node or switching device. More generally, however, the system functional state can be any condition which may prevent any operation of the network. The system functional state can be compensated by the system redundancy.

The server system preferably runs a network monitor process which detects the system functional state. A logical network process reconfigures the system, to make use of the redundancy to compensate for the system functional state.

The system also uses a distributed read and write system which allows alternative operation in the presence of a system fault. This alternative operation uses the system redundancy.

BRIEF DESCRIPTION OF THE DRAWINGS

These and other aspects of the invention will now be described with reference to the attached drawings, in which:

FIGS. 14A through 14E show calculation of parity rows in X code for an array code of 5 by 5.

DESCRIPTION OF THE PREFERRED EMBODIMENTS

Figure 1:
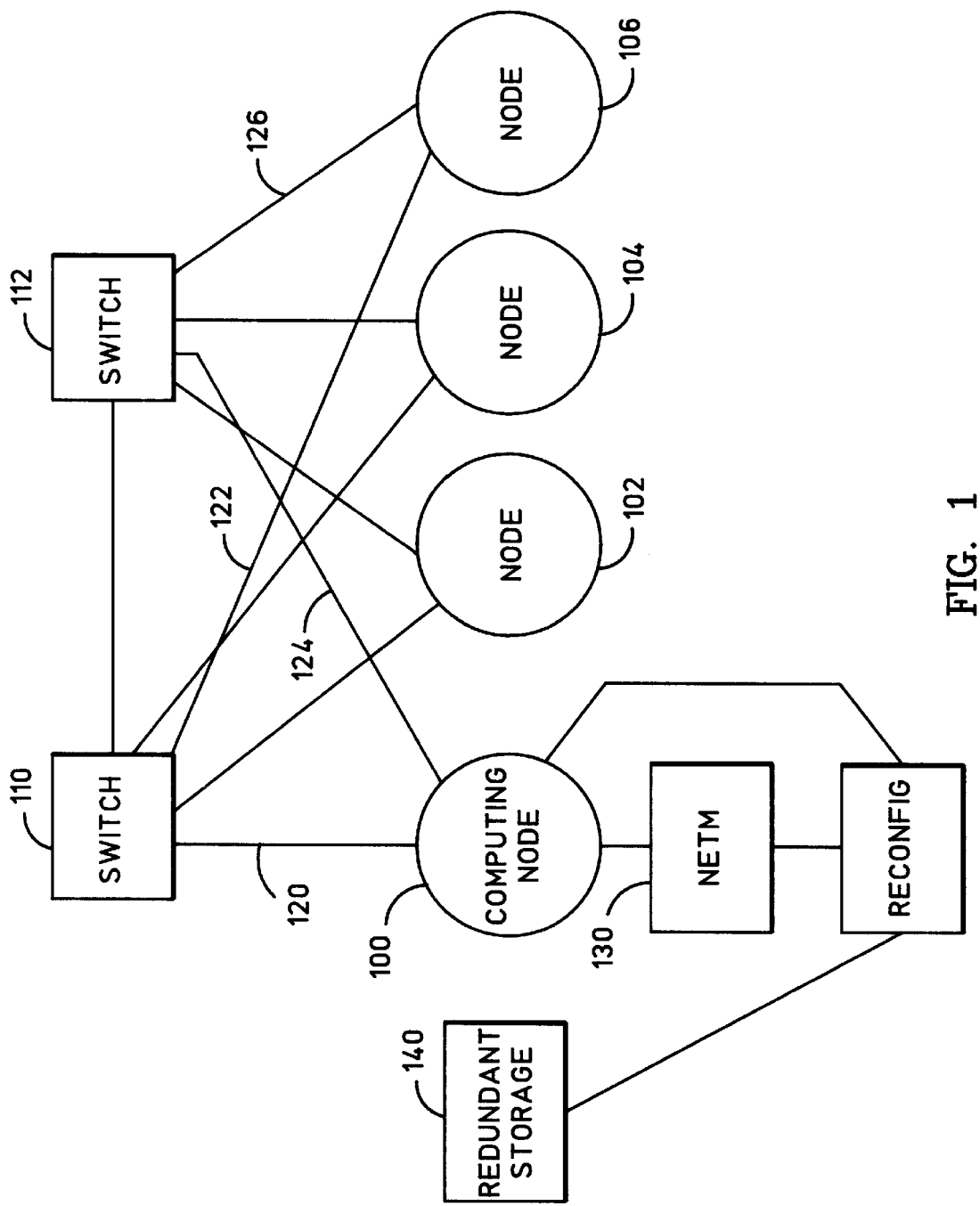
FIG. 1 shows a basic block diagram of the simplest networking example.

FIG. 1 shows a first, most basic embodiment of a reliable redundant distributed network server system. The system is formed of the computing nodes ("nodes") and the network which ID carries out switching between the nodes.

The network of FIG. 1 includes both communication and storage redundancy among the nodes and the network. This redundancy can be used to compensate for a defined number of system functional states. The system functional states which are compensated by the redundancy can include faults in the network ("communication faults"), faults in memory storage where the memory could be disks, volatile memory, or any other kind of memory which stores data ("memory faults"), or any other kind of fault which produces an undesired result.

The distributed server system also includes a detection process. The detection process operates in each node to view the connection to other nodes in the network. Each node views the network according to the same protocol, using a pool of hints about the condition of the network. This detection process guarantees that both sides see the same history of the network. Even though the detection process is distributed, it maintains the network history of the nodes of the network consistent within a desired threshold, using a token passing system. The tokens limit the degrees of freedom of the two sides, by allowing only a specified number of actions without an acknowledgment that the other side has taken an action.

The detection process runs invisibly relative to the other programs and user applications. The preferred mode of the detection process uses a network monitor ("NETM") process which operates to gather information about the system being monitored. That NETM process preferably determines whether the other node is properly operating. However, more generally, the NETM process determines a parameter related to usability. That can include, as in the following, is the system up or down. It could also include an indication of how busy that system is, which indication could be used for load balancing.

The system of FIG. 1 illustrates the features of the invention using four computing nodes ("nodes") 100, 102, 104, and 106 connected by two switches 110 and 112. Each node can communicate with each other node over two different and hence redundant paths. For example, node 100 can communicate with node 106 via interconnection 120 between node 100 and switch 110 and interconnection 122 from switch 110 to node 106. Node 100 can alternatively communicate to node 106 using interconnection 124 from node 100 to switch 112 and interconnection 126 from switch 112 to node 106. Each node, therefore, is connected to each other node by at least two completely separate and redundant connection paths.

This redundant communication capability allows selection of a different path in case it is preferable to avoid use of one communications link. For example, loss of switch 110 or any part of the line of 120 and/or 122 will still allow communication over lines 124 and 126 via switch 112.

The information is also stored in a redundant manner which allows retrieval of any information, even if any part of the network fails or is otherwise unavailable, e.g., due to high traffic. The redundant storage mechanism is illustrated in FIG. 1 as element 140. The data in redundant storage 140 is preferably stored such that loss of any n–κ nodes, where n is the total number of nodes in the system and κ is selected number, will not affect the ability to obtain any desired data from the system. This is preferably done by storing data according to a maximum distance separable ("MDS") coding system which includes stored redundancy information in each of the nodes. This redundancy information can be used with other node data to reconstruct the data for any missing node or nodes.

If the detection process determines any kind of undesirable system functional state, such as an inoperable node, or a broken communication link, a reconfiguration process is carried out. The reconfiguration process is robust against faults by virtue of its ability to use at least one of the storage redundancy or the communication redundancy. Reconfiguration process allows the system to operate in the presence of a specified fault. This might not, however, require any dedicated switching. For example, a path between nodes 100 and 106 can be established over path 1 via 120/110/122, or over path 2 via 124/112/126. Under normal operation, the communication would alternately occur over path 1, then path 2, then path 1, etc. However, if there is a fault or overload in path 1, then all communications will occur over path 2. This is a reconfiguration in the sense that the communications are appropriately directed. Even though half of the communications would have been directed over path 2 anyway, the reconfiguration makes all of the communications occur over path 2.

FIG. 1 therefore illustrates the basic features of the distributed server as described by the present specification. These features include redundancy of communication, redundancy of storage, detection of an event which can be compensated by the redundancy, and reconfiguration to use the redundancy to compensate for the event.

Redundant Communication

Figure 2:
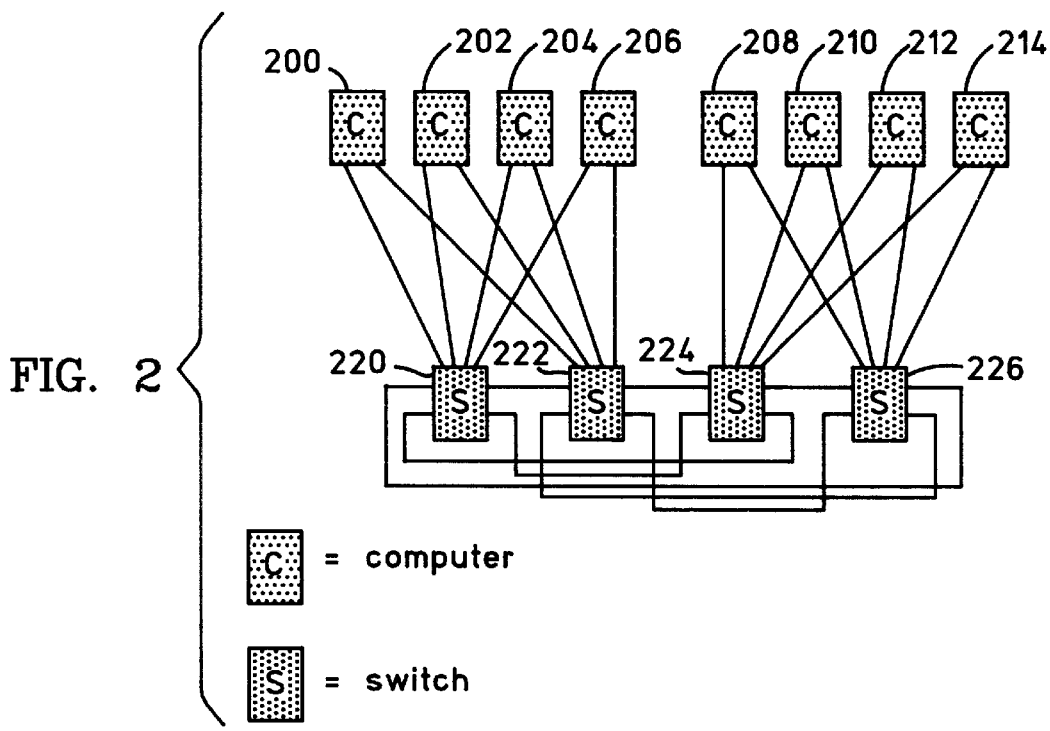
FIG. 2 shows a more complicated example with more switches and more computing nodes.

The FIG. 1 system shows a simple redundant connection with four nodes 100–106 and two switches 110 and 112. The nodes are preferably standalone workstations, such as personal computers ("PCS") each with two PCI bus-based communication cards. The communication cards communicate via the switches to similar communication cards in the other PCS. The protocol of the communication cards could be any commercially available type, such as Ethernet or others. The preferred system uses Myrinet switches for the switching nodes 200 as shown in FIG. 2. Myrinet switches are available for sale commercially, and are also described in Boden et al. "Myrinet : a gigabit per second local area network" IEEE Micro 1995.

The special node connection used by the present invention provides a communication redundancy which improves the ability to operate normally in the presence of network communication faults. These network communication faults include faulted communication, including switch faults, broken links, or switch failures. The connections are established in a way that minimizes the possibility that any communication fault or combination of communication faults could cause a communication disruption or isolation of nodes. The importance of proper connection is illustrated with reference to the following.

FIG. 2 shows a system that connects eight computing nodes 200 through 214 using four switches 220 through 226. Every computing node includes two possible interconnect link paths. This provides redundancy of communications.

Communication failures in the system of FIG. 2, however, have the possibility of undesirably "isolating" groups of computing nodes. These isolated groups of computing nodes are isolated in the sense that they are no longer able to communicate with all of the other working nodes of the distributed server.

As an example, if both switches 224 and 226 were to fail, then the computing nodes 200 to 206 would be totally isolated from the computing nodes 208 through 214. This causes an isolatable system which is usable, but less preferred.

For example consider an example where the MDS code used requires six of eight nodes to reconstruct data. If the system were isolated as explained above, then only half of the nodes would have communication. Since there would be four communicable nodes, this particular fault would prevent the data from being reconstructed.

Figure 3:
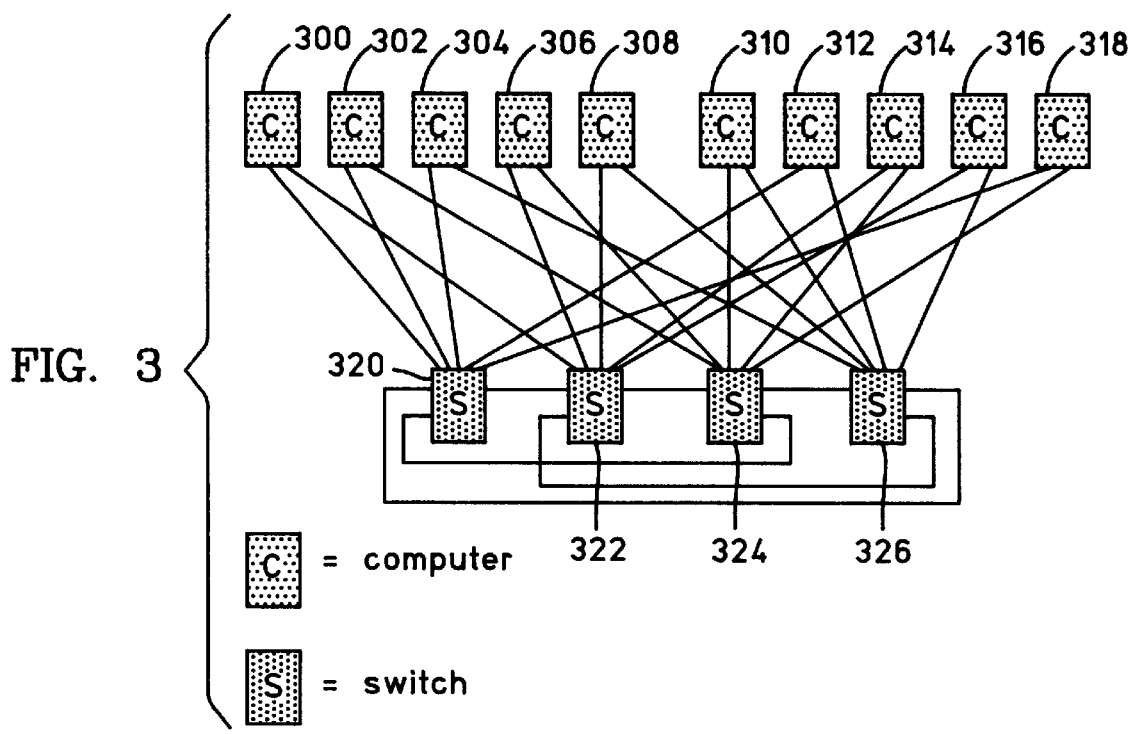
FIG. 3 shows an even further reliable networking example.
Figure 4:
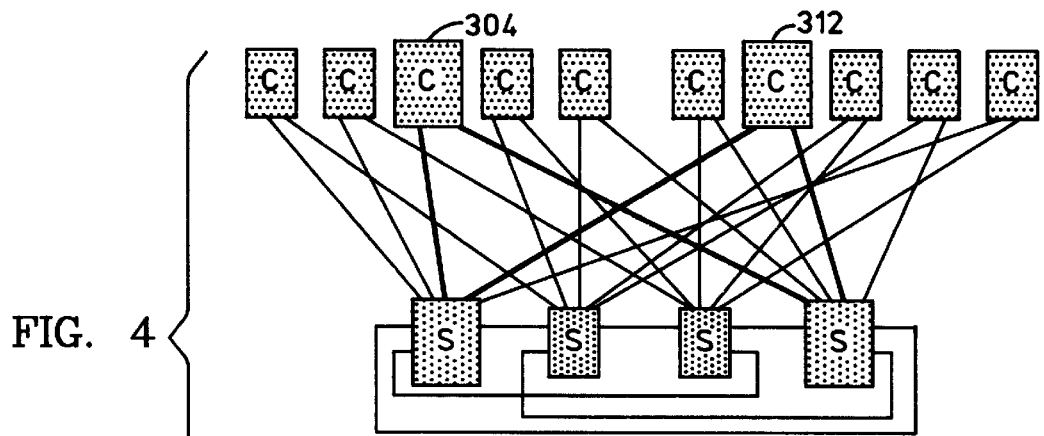
FIG. 4 shows a fault-tolerant system.

The connectivity structure of FIG. 3 is preferred. This ten node, four switch system has improved interconnection in the case of communications faults. The connection interface is made such that loss of any two switches can affect only two computing nodes in the worst case. See for example FIG. 4 which illustrates the situation of switches 320 and 326 having failed. The bolded lines show the communication lines which are affected by this failure. Only the computing nodes 304 and 312 are isolated by this two-switch failure. This leaves all other nodes being totally operational, and no isolation of nodes.

An important part of the fault tolerance is obtained from the specific interconnection of the switches and nodes. As an example given above, the FIG. 2 system has a possible drawback that it becomes possible to isolate two halves of the computing nodes. The isolated system includes computing nodes 200 through 206 which are capable of communicating but are isolated from the group of nodes 208 through 214.

Figure 12:
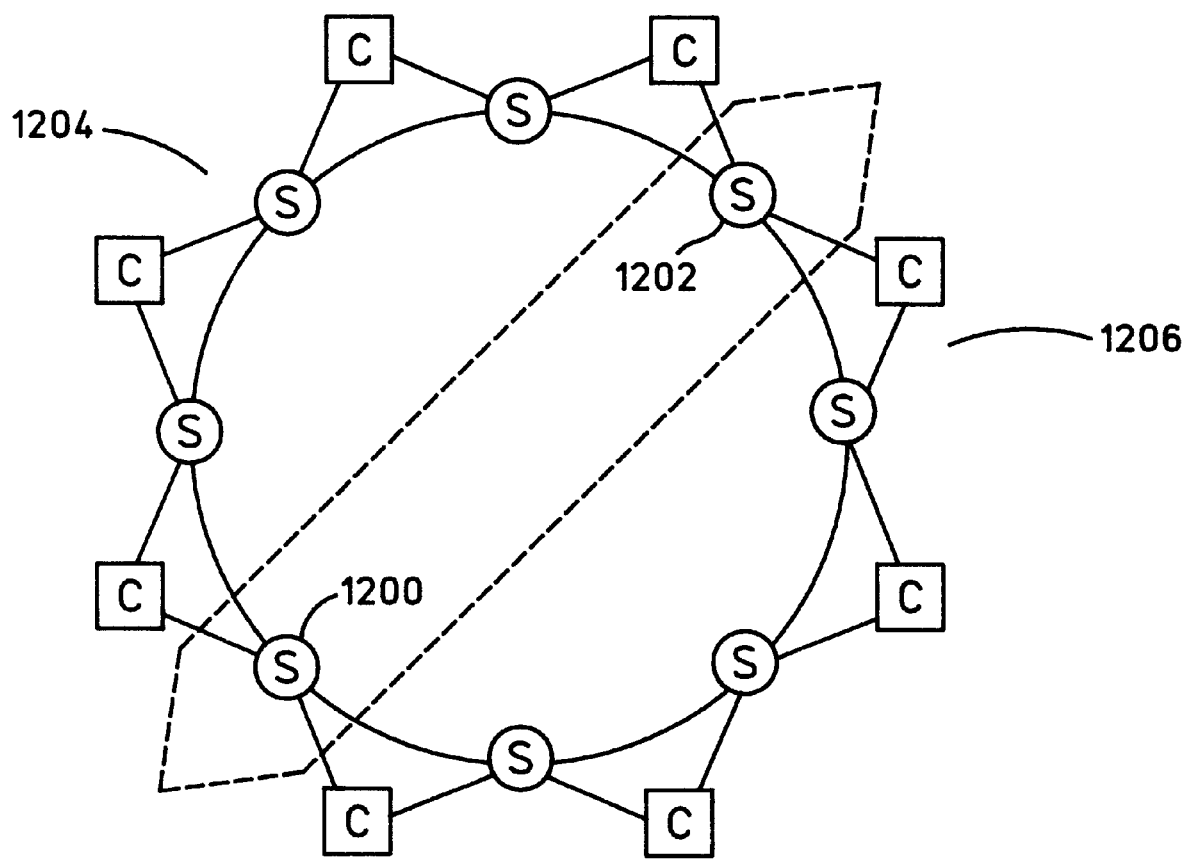
FIG. 12 shows a possible arrangement of computing nodes and switching elements.

Another example of the problem is shown in FIG. 12 which represents one possible way of interconnecting a number of computing nodes using switching nodes. Each switching node S is located between two adjacent computing nodes C. This is a usable, but less preferred configuration. Note that if switching nodes 1200 and 1202 ever become simultaneously faulted, the communication capability of the system will be split along the dotted lines shown in FIG. 12. This will effectively isolate one-half of the system 1204 from the other half of the system 1206.

An object of the connection described in this specification is to avoid this kind of possible isolation formed by any two communications failures. The preferred system describes connecting the nodes in the most non-local way possible. This compares with the system of FIG. 12 in which each switching node is connected to the two closest computing nodes. The inventors found that the unobvious system of connecting between non-local switches produces the highest degree of fault tolerance.

Figure 13:
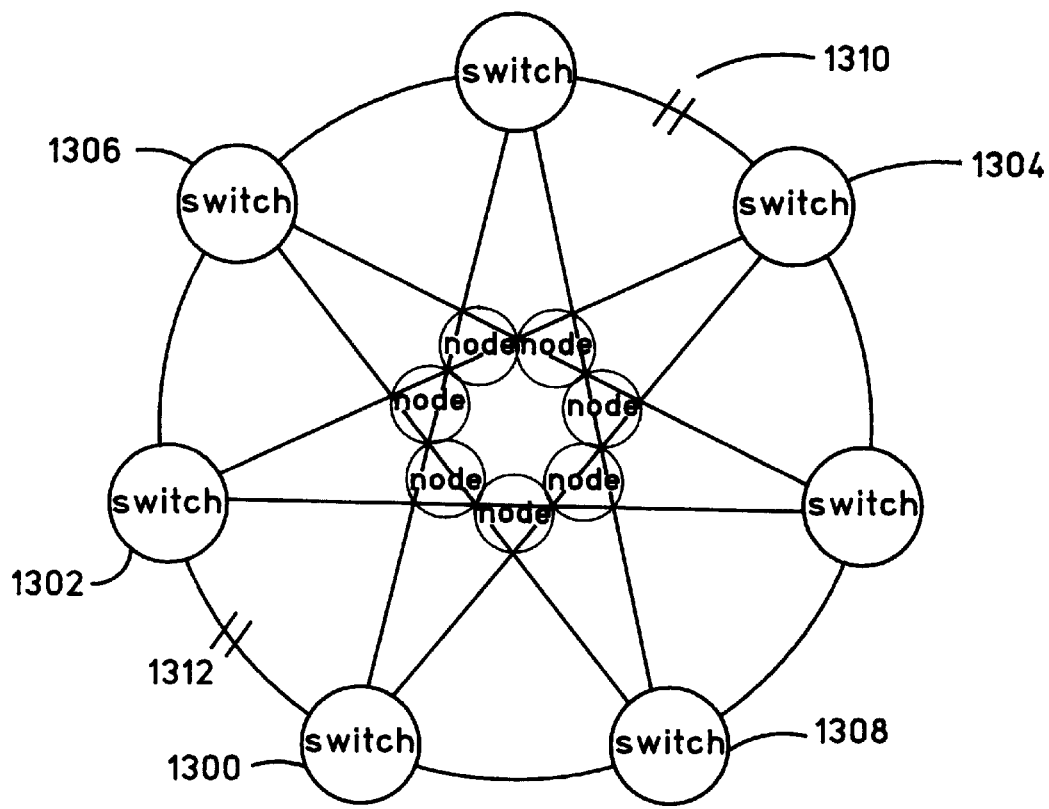
FIG. 13 shows a more advanced arrangement of computing nodes and switching elements.

FIG. 13 shows such a device. Each node is shown as connected to two switches. The diagram depicts the connection as being between any two most distant switches. When laying out the diagram of switches and nodes as shown in FIG. 13, this diagrams the connections as diameters to connect between two of the switches that are physically most distant from one another. This connection has the advantage that cancellation of any three switches cannot have the effect of isolating two halves of the unit. On the contrary, breaking the unit in any two places still allows communication between many of the nodes. Any three losses isolates only some constant number of nodes—those directly affected—regardless of total number of nodes in the system.

Assume for example, a communication failure at the location 1310 and another break at the location 1312. It is apparent that nodes can still communicate since switch 1300 is still connected to switch 1302 via switch 1304. Switch 1300 is also connected to switch 1306 via switch 1308. In an analogous way, all of these switches are connected to one another even if there is such a break. Moreover, with this preferred system, the most node to node connection that could possibly be necessary is one quarter of a way around the system.

The non-locality concept is also applicable to arrangements other than a ring. For example, any arrangement which could be visualized as a ring is alternatively usable.

The preferred server system shown in FIGS. 1 through 3 uses personal computer-based workstations connected via redundant networks using the Myrinet interconnect technology. Alternatively, of course, other communication technology, such as 100 MB Ethernet can be used. All of these systems have in common the capability of maintaining redundancy in the presence of faulty links. The system could be used with any number of communications elements, although two is the preferred and disclosed number.

Redundant Storage

Figure 5:
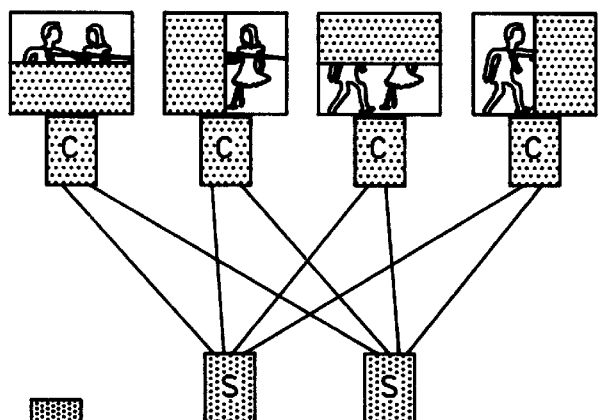
FIG. 5 shows an example of how this system would be used to store video.

In the preferred embodiment of FIG. 1, each node stores only a portion of any given stored data. The stored data is retrieved using a part of each information that is actually stored in the local node, and a part from other nodes. An illustration of this concept is shown with reference to FIG. 5. FIG. 5 illustrates a video server. The distributed server provides data indicative of video, which is displayed as shown. Each computing node is shown storing half of the total data. The data is redundantly stored such that any video frame can be reconstructed from the data in the one node requesting the data, when it is combined with the data in any other node.

This storage scheme allows any node to receive its desired information so long as that node does not become isolated from all other nodes. This scheme would provide storage redundancy for the case of many failures in the distributed server.

More generally, however, the preferred scheme defined herein allows reconstructing data from any subset of $\kappa$ working nodes out of the total of n nodes. The example given below includes $\kappa=2$ and $n=4$.

Figure 6:
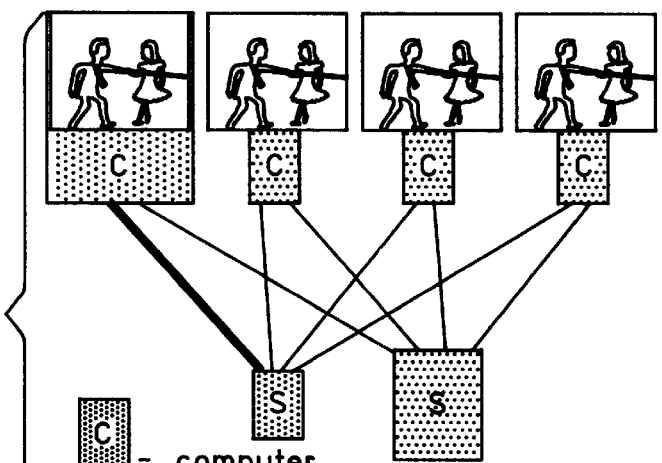
FIG. 6 shows how such a system could tolerate link faults.

FIG. 6 illustrates how the remaining computing nodes can reconstitute any item of served-out video, in the case of a node failure. This can be accomplished by any coding scheme which allows redundant storage.

The preferred system has the ability to lose any two communication links without losing any other communication function of the server system, and without effecting other nodes besides those which actually include the faults.

The redundant memory feature of the system stores encoded data of a smaller size than the total data half the data in each node. Therefore, for each file of size K in a system with $\kappa$ working nodes, in this preferred embodiment, K/$\kappa$ of that file is stored on each node of the server. The other ($\kappa-1$) of the file is obtained from other $\kappa-1$ working nodes.

X-Code

Storage redundancy is obtained according to the preferred embodiment by distributing the storage of the information between nodes. As explained above, for each item of information of size K, the preferred system stores K/κ data (the original size of the information)in each node, where κ is the number of nodes that will be necessary to reconstruct the data. Each node can reconstruct any of the items of information by accessing the other K/κ of the information from any other node. The information is preferably stored using a maximum distance separable ("MDS") code to store the information. The preferred mode of storing the information uses a new coding system called X-Code. The X-Code as described herein is the special, but optimized, code for storing each item of information spread among the nodes, and more specifically, the disks of the nodes.

Most preferably, only a part of the information, some portion of the encoded data, is stored on each node. Each node also stores information indicating some property of information on other nodes. For example, that property could be a checksum or parity, indicating a sum of data on the other nodes. That information is used along with the information on the other nodes in order to reconstruct the information on those other nodes.

As described above, the preferred code used is X-code, which is described in detail in the following. X-code is a Maximum Distance Separable ("MDS") array code of N by N where N is preferably a prime number. This code can be both encoded and decoded using only exclusive OR ("XOR") and cyclic shift operations. This makes X-code much faster to encode and decode as compared with more computationally-intensive codes such as Reed-Solomon codes.

The X-Code has a minimum column distance of 3. This means that the code can correct either one column error or two column erasures. X-code has a specific property that the change of a single information unit, e.g., a single information bit or symbol in X-code, will always effect only two parity bits or symbols. Therefore, whenever any information is updated, only those two parity bits or symbols will need to be changed.

Figure 15:
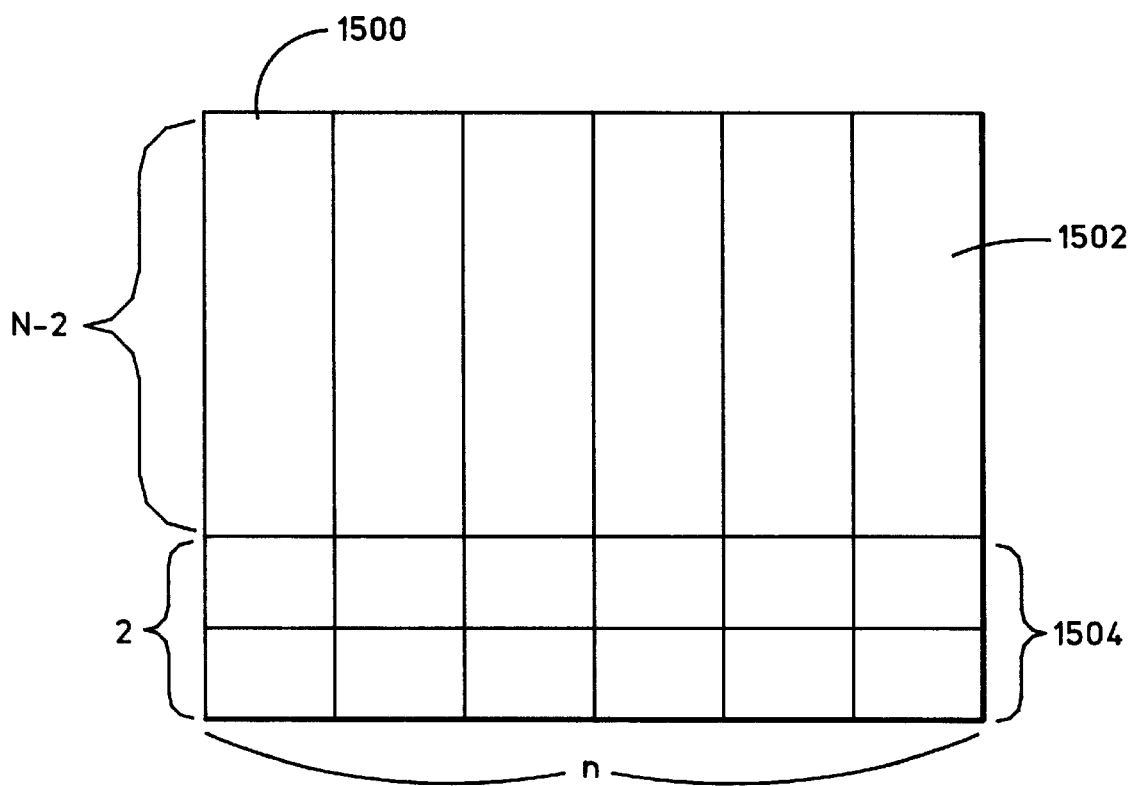
FIG. 15 shows the basic layout of the X code system.

The system of X-Code uses an array shown in FIG. 15. Each column 1500 represents the information in a single node. The parity symbols are stored in rows rather than columns.

The code is arranged using all the nodes of the network collectively to form an array of N×n where N is preferably= n. The array includes N–2×N information symbols, and 2×n parity symbols. FIG. 14A shows an exemplary array with n=5. The portion of the nodes 1400 represent the information, with each boxed element representing one unit of information, e.g. a bit, a sector or some other unit of a disk. These units will be generically referred to in this specification as symbols.

The non-information part 1402 represents redundant information. As will be explained herein, for any disk, e.g. disk number 1404 represented by a single column of the array, the redundant information 1402 represents redundancy information from other disks—that is the redundant information is only from disks other than 1404.

The X-Code system forms a column representing the contents of the entire disk 1404. The parity symbols of the X-Code are formed of two extra rows 1402 on the disk. Each disk therefore has N-2 information symbols as well as two parity symbols. Any error or erasure of a symbol in a column can be recovered from column erasures.

Turning specifically to the encoding procedure, if we let $C_{ij}$ be the symbol of the ith row and jth column, then the parity symbols of X-Code are constructed according to equation 1:

$$C_{n-2,i} = \sum_{K=0}^{n-3} C_{k,\langle i+k+2 \rangle_n}$$

$$C_{n-1,i} = \sum_{K=0}^{n-3} C_{k,\langle i-k-2 \rangle_n}$$

where I=0, 1, . . . , n–1, and $\langle x \rangle_n$=X mod n.

This translates in geometrical terms to the parity rows representing the checksums along the diagonals of slope 1 and –1, respectively.

FIG. 14A shows how the first parity check row 1410 is obtained by assuming that the second parity check row 1412 does not exist or is all zeros. This is referred to as an imaginary zero row. Checksums are formed on all diagonals of slope –1. In FIG. 14A, all of the triangle shapes are added to form the first parity check row 1410. This means that the elements 1414, 1416, 1418 and 1420 are added to form the parity element 1422.

FIG. 14B shows an example of calculating the first parity check row for exemplary single bits. Notice the diagonal elements 1414, 1416, 1418 and 1420 require addition of 1+1+1+0 leading to a parity of 1 which is stored as symbol 1422.

The diagonals are continued in an adjoining row once reaching the outer edge of the array. For example, the diagonal row including elements 1432, 1434, 1436 and 1438 is continued beginning at the top of the next row as 1440. The parity symbol 1436 corresponds to an addition of the symbols 1432, 1434, 1438 and 1440. FIG. 14B shows these symbols corresponding to 0+0+0+1 which equals 1. The value 1 is stored as symbol 1436.

The second parity check row is formed from a diagonal of slope +1. FIG. 14C shows this analogous second parity row calculation with FIG. 14D showing a specific example. The diagonal row includes symbols 1442, 1444, 1446, 1448 and 1450. Parity symbol 1442 is calculated as 1450+1444+ 1448+1446. FIG. 14D shows a concrete example where the parity is obtained from a sum of 0+0+0+1=1.

FIG. 14E shows the complete code word formed by combining the two parity check rows. The two parity check rows are obtained totally independent of one another. Each information symbol appears exactly once in each parity row. All parity symbols depend only on information symbols from other columns (other disks) and not on each other. Therefore, an update of one information symbol results in an update of only two parity symbols.

X-code as described above uses a prime number n allowing for real diagonal computation. If n is not prime, however, a different line of computation can be used. For example, any suitable given envelope which traverses all of the n–1 disks can be used according to X-Code. All of the lines are preferably parallel.

As described above, X-Code has a column distance of three allowing correction of two column erasures or one column error. An erasure is when there is a problem and it is known which area has the problem. An error occurs when the specific source of the problem is unknown. The decoding operation can be used without requiring finite field operations, using only cyclic shift and exclusive OR.

Correction of one erasure can simply recover that erasure along the diagonals of slope 1 or –1 using either of the parity rows.

9

In an array of size N by n, assume the two columns are erasures. In this case, the basic unknown symbols of the two columns are the information symbols in those columns. Since each of the columns has (n−2) information symbols, the number of unknown symbols become 2×(n−2). Similarly, the remaining array includes 2×n−2 parity symbols, including all of the 2×(n−2) unknown symbols. Hence, the erasure correction becomes a problem of solving 2×(n−2) unknowns from 2×(n−2) linear equations. Since these linear equations are linearly independent, these linear equations become solvable.

Moreover, no two information symbols of this code in the same column can appear in the same parity symbol. Therefore, each equation has at most two unknown symbols. Some equations have only one unknown symbol. This will drastically decrease the complexity of equation solving. The system used according to this system starts with any equation with one known unknown symbol. Solving for those equations is relatively simple. The process continues to solve for the other unknown solutions until all equations are solved.

Suppose the erasure columns are the ith and jth ($0 \leq I < j \leq n-1$) columns. Since each diagonal traverses only n−1 columns, if a diagonal crosses a column at the last row, no symbols of that column are included in this diagonal. This determines the position of the parity symbol including only one symbol of the two erasure columns. The symbol can be recovered from the simple checksum along this diagonal.

First consider the diagonals of slope 1. Suppose the xth symbol of the ith column is the only unknown symbol in a diagonal. Then, this diagonal hits the jth column at the (n−1)th row, and hits the first parity row at the yth column, i.e., the three points (x,i), (n−1,j) and (n−2,y) are on the same diagonal slope 1, thus the following equation holds:

$$\begin{cases} (n-1) - x \equiv j - i \bmod n \\ (n-1) - x \equiv j - i \bmod n \end{cases}$$

$(n-1)-(n-2) \equiv j-y \bmod n$

Since $1 \leq j-I \leq n-1$, and $0 \leq j-1 \leq n-1$, the solutions for x and y are $x = \langle (n-1)-(j-i) \rangle_n = (n-1)-(j-i)$ $y = \langle j-1 \rangle_n = j-1$ So, the parity symbol $C_{n-2, j-1}$ allows calculation of the symbol $C_{(n-1)-(j-I),I}$ in the ith column. Similarly, the symbol $C_{(j-I)-1,j}$ in the jth column can be solved directly from the parity symbol $C_{n-2,<I-1>n}$.

Symmetrically with the diagonals of slope −1, the symbol $C_{(j-I)-i,i}$ in the ith column can be solved from the parity symbol $C_{n-1, <j+1>n}$, and the symbol $C_{(n-1)-(j-I),j}$ in the jth column can be solved from the parity symbol $C_{n-1, i+1}$.

Notice that an information symbol is crossed by the diagonals of slope 1 and −1 exactly once, respectively. If an unknown symbol is solved along a diagonal of slope 1 (or −1), then the parity symbol along the diagonal of slope −1 (or 1) which crosses the solved symbol, another unknown symbol in the other column can be solved. This procedure can be used recursively until the parity symbol is an erasure column or the solved symbol itself is a parity symbol. These same techniques can be used to recover any desired unknown symbol or symbols.

The preferred system uses N=n or N being prime. Systems such as FIGS. 5 and 6, (n=4; k=2) can also be used as described above.

10

Distributed Read/Write

The system allows a new kind of operation by its use of a distributed read and write system.

The redundant storage of information allows the system to read from all n of the nodes to maximize the bandwidth of the system. In that case, the system is reading only from the raw information parts 1502 of the nodes.

Alternatively, only κ of the nodes are read, but those κ are read along with their parity portions 1504. Unlike the conventional "correcting", this system selects which of the available clusters will be used, based on the system's view of the state of the network different parts could be used for different codes, e.g., the even/odd code.

Distributed write involves writing to all effecting nodes each time information is changed. However, the update is maintained to be as small as possible. The MDS code guarantees redundancy and makes the update optimally minimum and efficient. Average unit parity update number represents the average number of parity bits that is effected when a change of a single information bit occurs in the codes. The parameter becomes particularly crucial when array codes are used in storage applications. X-code is optimal in the sense that each single information bit change requires an update of only two parity bits.

Another important feature of X-code follows from its formation of independent parity bits. Many of the codes, which have been previously used, rely on dependent parity columns in order to form code distances of three. Since the parities are dependent on one another, the calculation of these parities can be extremely complicated. This often leads to a situation where the average unit parity update number of the code increases linearly with the number of columns of the array.

Systems such as the EVENODD code described in U.S. Pat. No. 5,579,475 and other similar systems use independent parity columns to make the information update more efficient.

Detection

The distributed data storage system spreads the server function across the nodes. This is done according to the present system using a special communication layer running on each of the multiple nodes which is transparent to the application. A special distributed read system and distributed write system also maintains the robust operation of the system.

Figure 7:
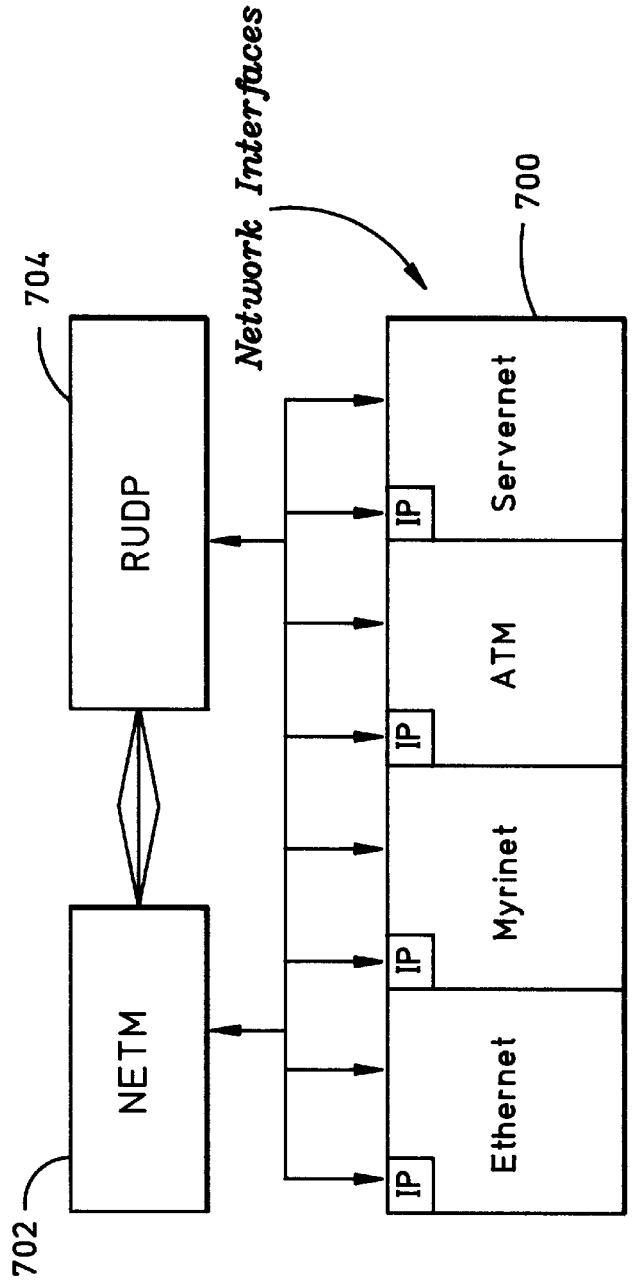
FIG. 7 shows a block diagram of a software architecture for reliable communications.

The communication architecture of the preferred system is shown in FIG. 7. The actual communication and network interfaces are shown as elements 700. The communication can be done in any conventional manner, including Ethernet, Myrinet, ATM Servernet, or any other conventional schemes of communication. These conventional network interfaces are controlled by the redundant communication layer.

The communication is monitored by the net monitor ("NETM") protocol system 702. NETM maintains a connectivity protocol which determines channel state and history of the channel state at each node. More specifically, NETM monitors all connections from the local node on which NETM is running, to each remote node, over each connection path from the local node to the remote node. NETM maintains a connectivity chart which includes an indication of the status of all of the possible connections from the local node to each remote node at all times.

The actual communication is controlled by the reliable user data protocol ("RUDP"). RUDP operates based on a request to communicate from the local node ("node A") to some other node ("node B"). RUDP then obtains connectivity information about properly-operating communications paths from node A to node B from NETM. RUDP selects a communication path using the information gathered by NETM, and sends the information using bundled interfaces. RUDP also properly packages the information using known protocol systems, to provide in-order confirmed delivery.

NETM system runs on each node of the system to find information about the system. NETM sees the node on which it is running as the local node. NETM uses system clues to determine the state of the connection between the local node and all other nodes in the system.

Since the same protocol is running on all nodes, each NETM process on each node will determine the same condition for any given A to B connection state. NETM also uses a history checking mechanism, such that all nodes see the same history of channel state over time.

The preferred system clues are obtained from messages that are sent from node A to each other node in the system, over each possible path to the other node. These messages are called "heartbeats". NETM sends a message from the local node ("node A") to each remote node ("node B") over each pathway. Each connection is characterized by three items of information called the Ci,j,k "tuple" including I=local interface; j=remote node and k=remote interface. This tuple defines an unambiguous path.

NETM uses the heartbeats to determine if there is an operational communication link between A and B over each pathway Ci,j,k. Since the NETM protocol is also running on node B, that remote NETM will likely make the same decision about the state of connectivity from node B to A over pathway Ci,j,k.

Certain faults, such as, for example, a buffer overflow, might cause a loss of channel in only one direction. The connection protocol uses a token passing system to make the history of the channel symmetrical.

The history detection is based on a pool of hints about the operability of the connection. The heartbeat is the preferred hint, and is described herein in further detail. Another hint, for example, is a fault indication from the communication hardware, e.g., from the Myrinet card. If the Myrinet card that is controlling the communication on path X indicates that it is inoperable, the protocol can assume that path to be inoperable.

The pool of hints is used to set the state of a variable which assesses the state of the communication path A to B over X. That variable has the value U for up and D for down.

Figure 8:
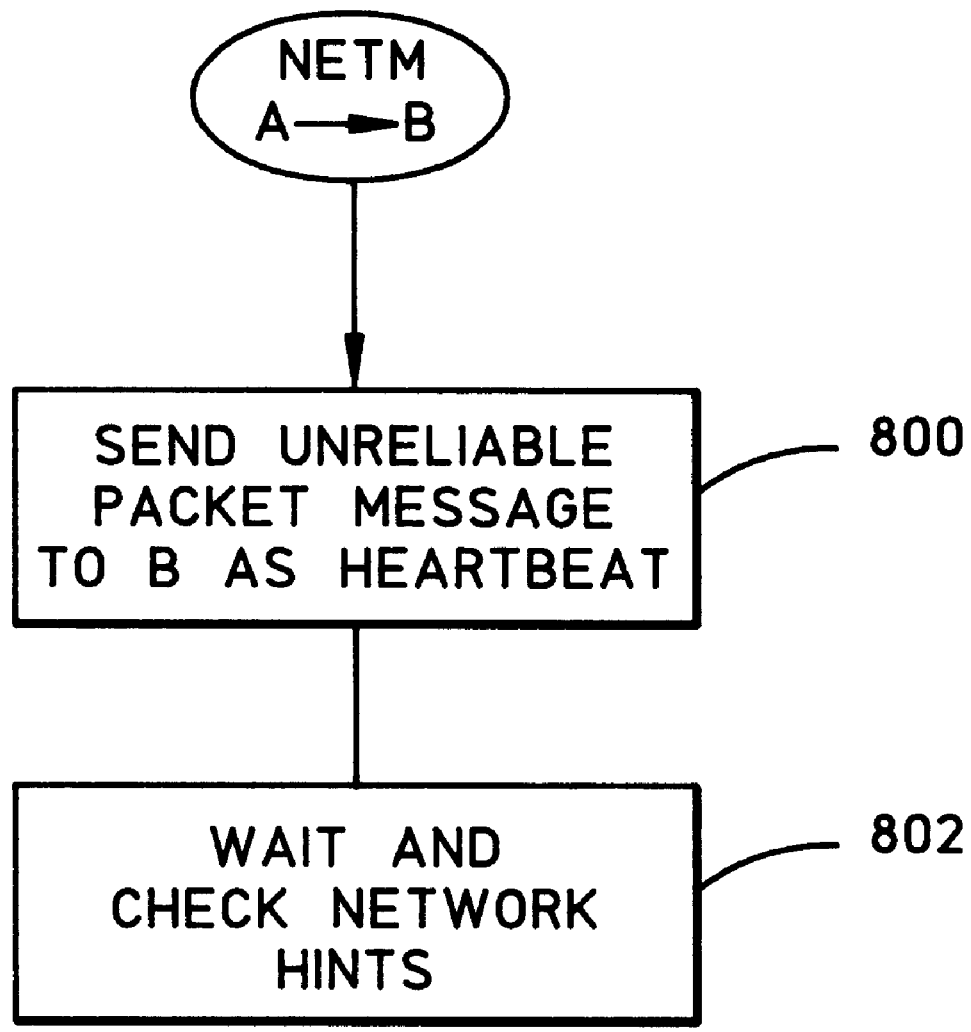
FIG. 8 shows a basic software flowchart of the network monitor process.

The operation is shown in the summary flowchart of FIG. 8. The FIG. 8 embodiment uses a heartbeat message formed from an unreliable message. A reliable messaging system requires the sending node to receive confirmation of receipt of a message. The sending node will continue to send the message until some confirmation of receipt of the message is obtained by the sending node. In contrast, the FIG. 8 system uses unreliable messaging: that is, the message is simply sent. No confirmation of receipt is obtained.

The message 800 is sent as an unreliable package message to node B. The heartbeat is preferably sent every 10 ms. The system waits and checks network hints at step 802 to assess the state and history of the network link. The heartbeat can be any message that is sent from one node to the other node.

Since the same protocol is running on each node, each node knows that it should receive a heartbeat from each other node each 10 ms. Each NETM runs a timer which is reset each time that NETM receives a heartbeat from the other node. If the timer expires without receiving a heartbeat from the other node, then the judgement can be made that there is a problem with the connection.

Each side also tries to ensure that it sees the same history over time. This is carried out by passing reliable tokens between the pair of nodes constituting the point to point protocol. Each token indicates that the node has seen an event. When the token is received by the other node, it, too should have seen a comparable event and sent a token. Each side passes a token when it sees the event. This maintains the history on both sides as being the same.

Each side has a finite number of tokens that can be passed. This has the effect of limiting the number of events that can occur before the event is acknowledged by the other node. For example, if there are two tokens per side initially, then the node only has two tokens to pass. After each perceived change in channel state, a token is passed. If no token arrives from the other side, the node will run out of tokens after these two perceived changes. This means that each node can only be two events or actions ahead of (or behind) the other node. The token passing limits the number of degrees of freedom between the two nodes—how far apart the two nodes can be before one holds the reported state of the channel as down waiting for the other side to catch up.

Another way of looking at this is that the tokens set the maximum number of transitions that one node can make before hearing that the other node has acted similarly.

Figure 9:
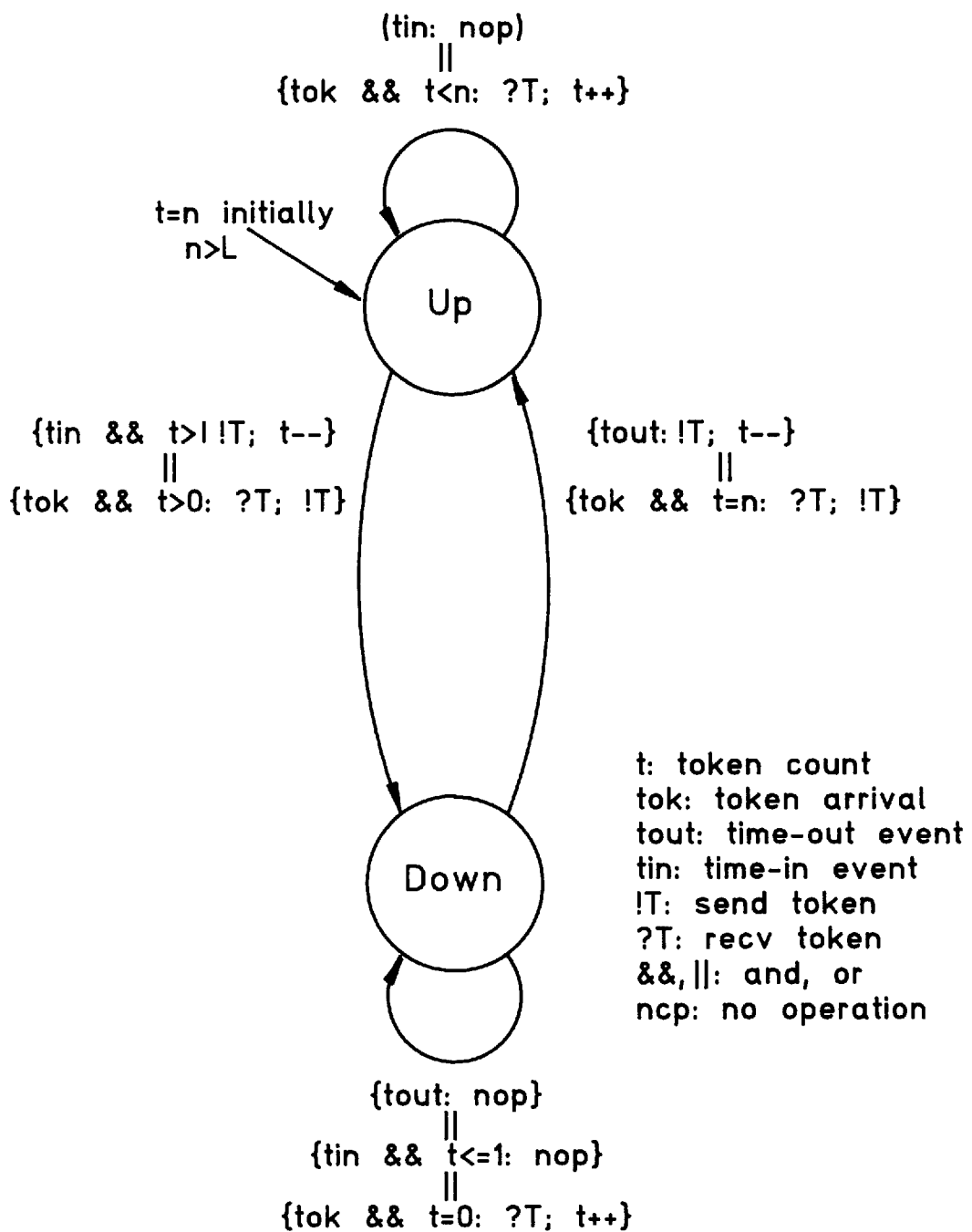
FIG. 9 shows a connectivity protocol state machine for the network monitor process.
Figure 10A:
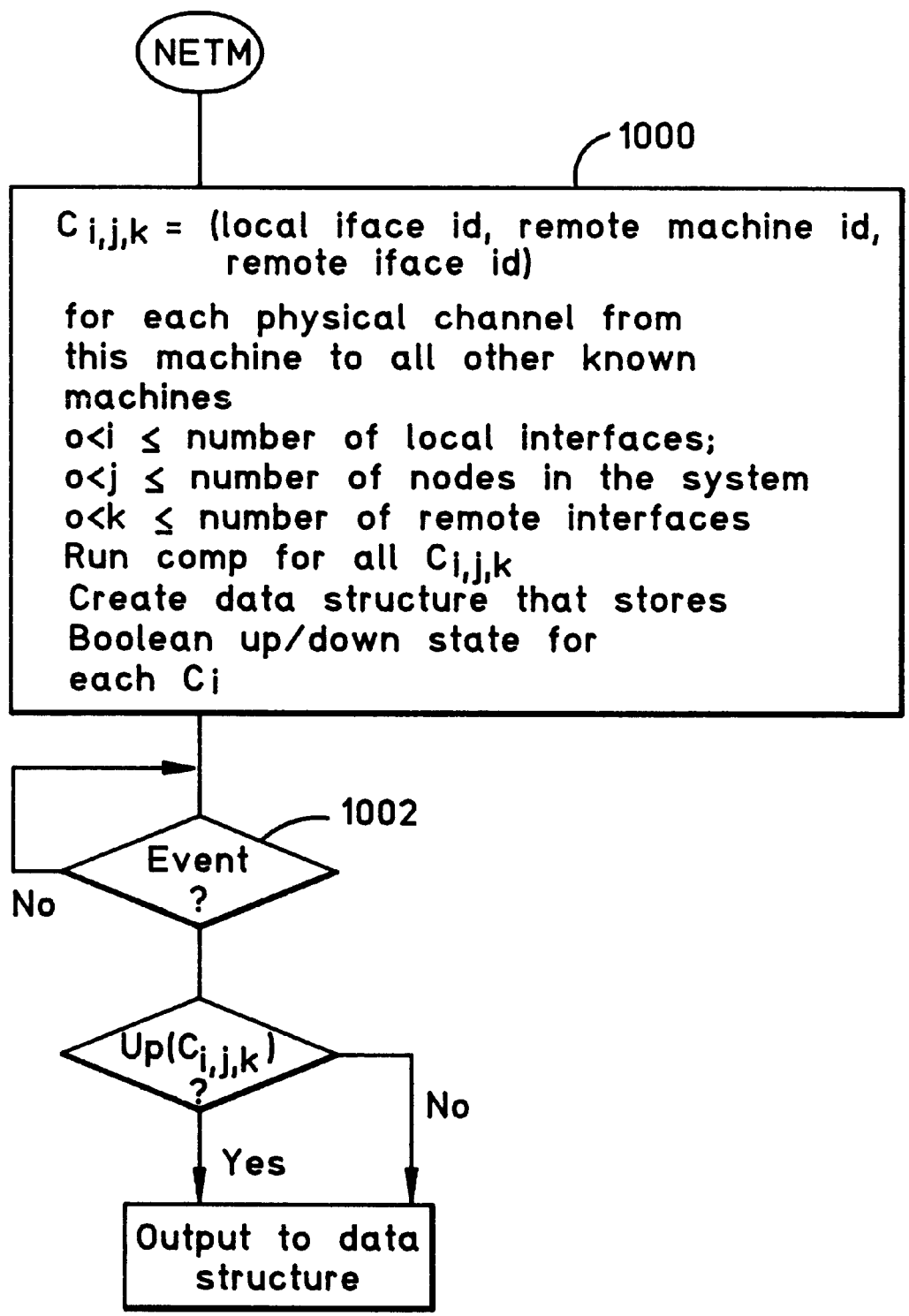
FIG. 10A shows formation of the data structure for connectivity.
Figure 10B:
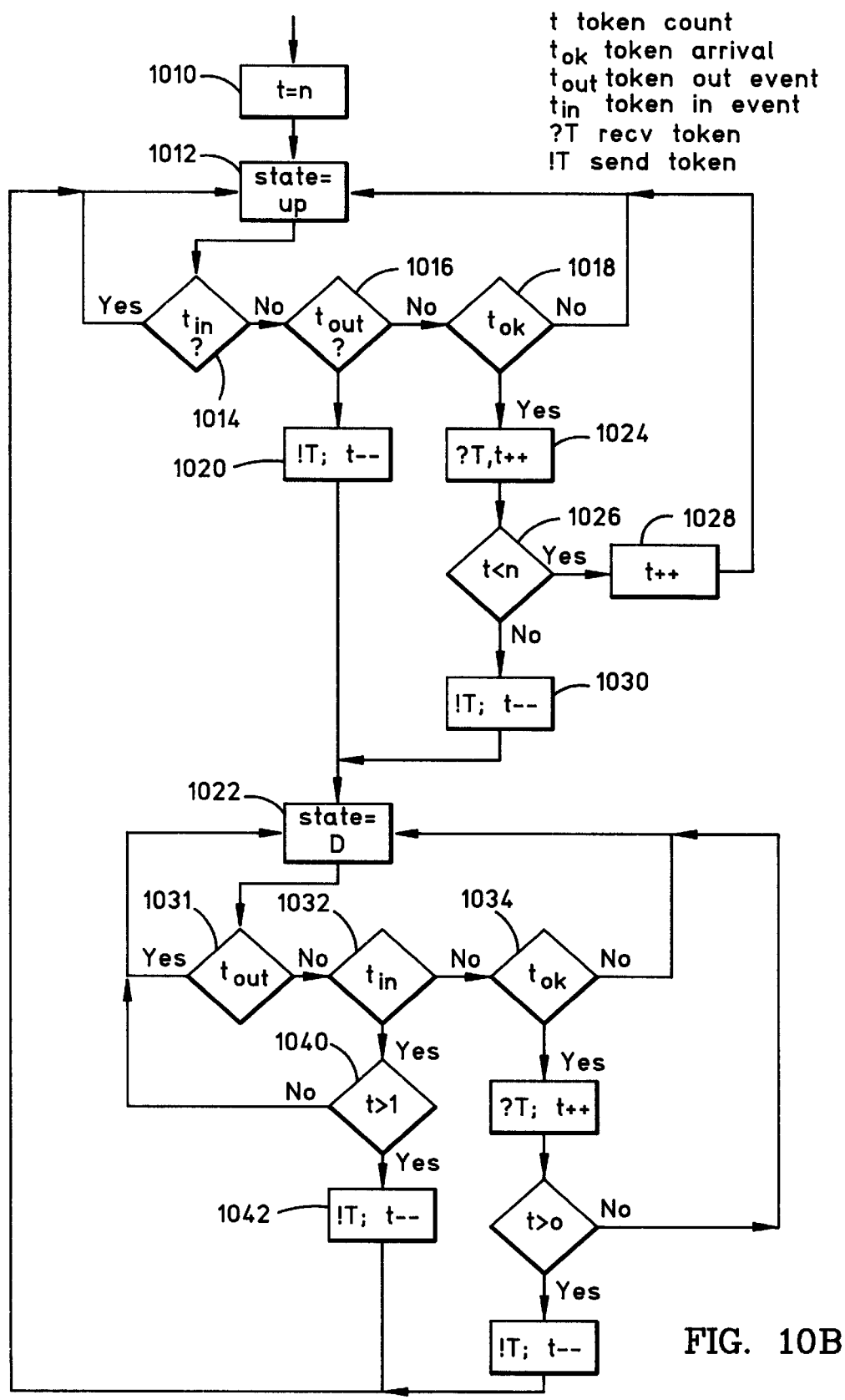
FIG. 10B shows a flowchart of the link status operation.

The preferred embodiment of the NETM system is illustrated in the connectivity protocol state machine of FIG. 9 and the flowchart of FIGS. 10A and 10B. Step 1000 comprises an initial step of forming the Ci,j,k 3-tuple comprising the local interface ID, the remote machine ID and remote interface ID for each possible physical channel from the node to all other known nodes. The process ConnP ($C_i$,j,k) is run for all $C_i$,j,k 3-tuples to determine the connectivity state for each of these channels. This creates a data structure called Connected(Ci,j,k) that stores a Boolean value indicating the up/down (1 or 0) status for each $C_i$ channel.

Step 1002 determines whether there has been a ConnP ($C_i$,j,k) event. If not, there is nothing to do, so the process returns.

If there is an event detected at step 1002, flow then proceeds to step 1004 which determines if the event is a system up event. If so, the result returns a "1". If not, the result returns a "0".

The link status flowchart of FIG. 10B uses a count of "tokens" as evidence of the operation of the other endpoint system.

At step 1010, the process begins with the token count ("t") being set to its initial value n≧2. The system starts with its state initially being up ("1") at step 1012. Step 1014 detects whether there has been a time-in event. A time-in event is caused, for example, by the receipt of a heartbeat from the node B. Since the state is already up at this point, the detection of a time-in event leaves the state up and takes no further action. If there is not a time-in event at step 1014, then 1016 determines a time-out event caused, e.g., by not receiving an expected heartbeat before the timer expired. If not, step 1018 determines whether a token has been received ("a token arrival event"). If none of these events have occurred, control again passes to step 1012 where the node continues to monitor whether one of those events has occurred. Since the system always has a token at that point, there is no need to check for another one.

The time-out event at step 1016 means that no heartbeat has been received from node B over path X, so that there is likely a problem with communication to node B over path X. Hence, control passes to step 1020, which sends a token to the node B indicating the time out event reporting the omission of heartbeats for the specified time. Since the token has been sent, then token count is also decremented at 1020. This is followed by changing the state of ConnP to D at step 1022.

A token arrival event at step 1018 is followed by a step of receiving the token at 1024 and incrementing the token count. If the current token count is less than the maximum token value n at 1026, the token count is incremented at 1028. Since there is a missing token, the transition on the other end is within the allowable degrees of freedom allowed by the token passing scheme and the received token brings the two sides back in sync.

If the token count is not less than n, the token count is at its maximum value. The system therefore needs to undergo a transition. This is effected by sending a token at 1030, followed by the system going down, indicated by ConnP→0 or D at 1022. This begins the down routine processing operation.

The down routine processing operation is analogous to the up routine processing operation. A time-out event is detected at 1031 which has no effect since the system is already down. A time-in event is detected at 1032. This time-in event will allow the system to return to the UP state, providing that a token exists to send in order to indicate the transition. The routine checks for a token at step 1040. If none are available, then no transitions can occur, and flow returns to 1022. If a token exists to be passed, then it is passed at 1042, and the token count is decremented. The ConnP variable returns to its UP state, and begins the token processing routine.

Each system of node A to node B over path X is characterized in this way by the NETM protocol.

The applications run on top of RUDP. For example, an application with a process ID first identifies itself to the system. For example, the application may send a message identifying itself as process 6 and indicating a desire to send to process 4. This identification uses the $C_{i,j,k}$ tuple described above. NETM determines a communication path for this operation.

The actual communication, once determined, operates using the so-called sliding window protocol. Sliding window is well known and is described, for example, in U.S. Pat. No. 5,307,351. Sliding window supervises a reliable messaging scheme by appropriate packaging of the data packet. Sliding window essentially manages sequence numbers and acknowledges. The data is sent as a reliable packet, requiring the recipient to acknowledge receipt before more that one window will be sent out. Once the receipt is properly acknowledged, the window of information "slides" to the next unacknowledged packet of information.

RUDP uses the sliding window module to perform the actual communication. RUDP also calls NETM to provide a valid information path. If more than one of the paths between nodes is usable, then RUDP cycles between the usable paths.

RUDP also acts as a logical network by reconfiguring the system using the information provided by NETM.

Figure 11:
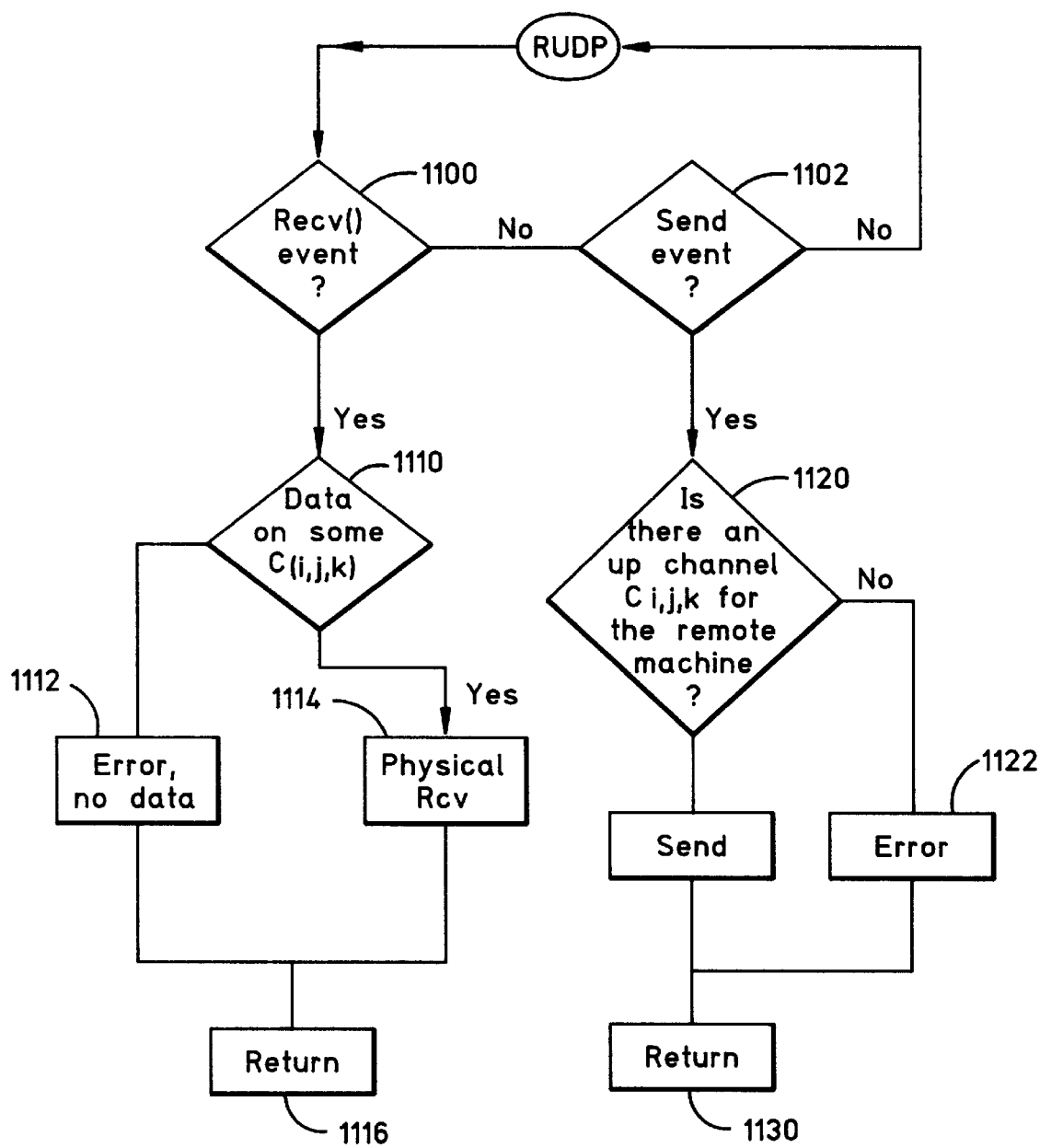
FIG. 11 shows a flowchart of the RUDP process.

The basic RUDP flowchart is shown in FIG. 11. The operation starts with a determination of a receive event at step 1100. If no receive event is received at step 1100, step 1102 determines if there has been a send event. If not, LNET has nothing to do, and flow returns to continue checking for events.

If a receive event is detected at step 1100, flow passes to step 1110 which determines whether the data is indicative of some $C_{i,j,k}$ tuple. If not, an error is determined at step 1112.

If proper data is obtained, that data is received at step 1114 and then returned to the system at step 1116.

A send event requires the $C_{i,j,k}$ arguments indicating the data to be sent, and the remote machine to receive the event. This requires a determination at 1120 of whether some up channel $C_{i,j,k}$ exists for the remote machine indicated as one of the arguments of the operation. If not, step 1122 declares a lost connection error. If, in the more usual case, at least one up channel exists, its address is using the arguments of the $C_{i,j,k}$ tuple. The process then returns at 1130.

The process 1120 uses NETM to look up the existing paths from the local machine to the remote machine. Therefore, NETM maintains the data structure while LNET uses the data structure.

INFORMATION SERVER

The system described herein has special application in an information server—i.e. a server that provides information to a user on request. The information server can be an Internet (web) server, a video server, or any other type device where information is provided.

The system is used as a server in the sense that any node can request any stored information from any other node or combination of nodes. For example, a request can be made which requires the information from 25 different nodes. This system can select the 25 closest nodes or 25 least-used nodes. This allows the system to ignore overloaded nodes just as if they were faulted.

When it is used as a video server, the video that is to be delivered might be stored anywhere on the system. According to the present scheme, the video is stored as distributed information among the different nodes of the network in a way that allows the video information to be retrieved even in the event of specified network failures.

The server system requests the video to be provided from the node that is storing it. The special techniques of the system ensure that no specified number of failures can interrupt operation of the system as a whole. No two node failure, for example can prevent obtaining the stored information, since the information is redundantly stored at other locations in the network.

Another application is as a web server. The web server uses the TCP/IP protocol and packeted communications to obtain Internet information. Again, this information could be stored anywhere within the distributed server. No two faults of any kind—communication or storage, can prevent the information from being obtained.

Another application of this system is in expansion and repair. Any node can be removed at any time, and the rest of the system will continue to operate without interruption. That node could be replaced with a blank node, in which case the network will begin writing information to the blank column it sees using the redundancy data.

Although only a few embodiments have been disclosed in detail above, those having ordinary skill in the art will recognize that other embodiments are within the disclosed embodiments, and that other techniques of carrying out the invention are predictable from the disclosed embodiments.

What is claimed is:

1. A redundant distributed network system, comprising:
a plurality of system nodes, each of said system nodes including at least two communication devices and a storage device, said storage device including redundant storage information for the network to permit reconstruction of stored data from the storage information in any one node when combined with data in any other node;

a plurality of switching devices, connected to said communication devices of said system nodes in a way such that each of said conmunuication devices in any one system node is connected to a different one of said switching devices, allowing each of said system nodes to communicate to each other of said system nodes over one of at least two different paths, thereby providing redundant communication;

a detection routine at each node which detects system functional stated which may prevent any operation of the network system; and a logical network process which reconfigures the network using one of at least said communication device redundancy and said storage information redundancy as needed to compensate for the system functional state using the network redundancy.

2. A system as in claim 1, wherein said detection routine detects functional states on at least a plurality of said system nodes, with an identical protocol being run by each said detection routine on each of said system nodes.

3. A system as in claim 1, wherein said system functional state include faults in network communication or faults in memory storage or any other kind of fault which produces an undesired result.

4. A system as in claim 3, wherein when said system functional state includes a fault in network communication, said logical network process commands a connection to be changed to a different connection.

5. A system as in claim 4, wherein when said system functional state includes a fault in memory storage, said logical network process commands desired information to be obtained from said redundant data storage.

6. A system as in claim 1, wherein said detection routine operates in each node to view a state of connection to other nodes in the network.

7. A system as in claim 6, wherein said detection routine operates to determine said state of connection using hints about a condition of the network.

8. A system as in claim 7, wherein said hints include a heartbeat signal which is produced by each said node at specified intervals, and said detection routine operates to receive said heartbeat signal and to detect a presence or absence of said heartbeat signal as one of said hints.

9. A system as in claim 7, further comprising a token passing system, wherein each node determines events in a monitored node over a monitored channel and passes a token to said monitored node over said monitored channel to indicate said event, wherein said monitored node passes back said token to indicate operation based on said event, and wherein each node has only a specified number of tokens to limit a number of events which can occur on one of said nodes without a corresponding event occurring on the other of said nodes.

10. A system as in claim 6, further comprising means for guaranteeing that each said node sees a same history of the network.

11. A system as in claim 1, wherein said connection is made such that no groups of computing nodes can be isolated.

12. A system as in claim 1, wherein said switches connect said nodes in the most non-local way possible.

13. A system as in claim 12, wherein said switches connect between two nodes which are farthest from one another.

14. A system as in claim 13, wherein said connections are made such that no failure of any two nodes can isolate any group of nodes from communicating with any other group of nodes.

15. A system as in claim 1 wherein each node is connected with each other node by at least two paths, and further comprising a network monitor process running at each said node and monitoring all connections from a local node on which said network monitor is running to each remote node over each connection path from the local node to the remote node.

16. A system as in claim 15, further comprising a reliable user data protocol running on said local node, and receiving a request to communicate from the local node to some other node, and determining a path from said network monitor process.

17. A system as in claim 16, further comprising reconfiguring a path of said communicating using a logical network interconnection that allows changing a physical connection between the nodes to a different node connection.

18. A system as in claim 1, further comprising a network monitor, determining operational connections among said nodes, a reliable user protocol, which processes information for the running nodes, and a logical network which reconfigures the communications based on said operational connections.

19. A system as in claim 1, wherein said storage device stores only a part of the information on each disk of each node.

20. A system as in claim 19, wherein each disk of each node also stores information indicating some property of information on other disks.

21. A redundant distributed server, comprising:

an array of distributed computing nodes, each of said computing nodes having different stored information man each other node, and said stored information being redundant among said computing nodes to permit reconstruction of stored data from the stored information in any one node when combined with data in any other node;

a switching system, connected to said array of computing nodes, and providing redundant communication paths among said array of computing nodes, operating such that any specified number of network faults will not affect the operation of the remaining nodes of the system, each of said computing nodes running the same protocol to determine network status, such that each said computing node will see the same network history and each said computing node including a detection routine that detects a system functional state that may prevent operation of the network system.

22. A server as in claim 21, wherein said stored information on each node stores only part, but not all of any desired information, and wherein no two nodes store the same information.

23. A server as in claim 22, wherein said stored information at a node includes an information portion, and a redundancy portion, said redundancy portion being information indicative of information portions for other nodes only.

24. A server as in claim 23, wherein said redundancy portion is formed from an array code where a plurality of said nodes are arranged into an array to form said information portion, and said redundancy portion are formed from checksums along diagonals of said array.

25. A redundant video server system, comprising:

a plurality of system video storage nodes, each of said system video storage nodes including at least two communication devices and a storage device, said storage device including redundant storage of video information;

a plurality of switching devices, connected to said communication devices of said system video storage nodes in a way such that each of said communication devices in any one system node is connected to a different one of said switching devices, allowing each of said system nodes to communicate to each other of said system nodes over one of at least two different paths, thereby providing redundant communication, a connection on said switching devices and the redundant storage of video information being of a form that no specified number of failures can interrupt operation of the video server;

a detection routine at each node which detects system functional state which may prevent any operation of the network system; and a logical network process which reconfigures the network using one of at least said communication redundancy or said storage redundancy to compensate for the system functional state using the network redundancy.

26. A method of operating a network to provide redundancy, comprising:

executing a controlling process that carries out a distributed read from a plurality of nodes, each of the nodes including at least two communication devices and a storage device, collectively storing system data, each node storing raw data, and redundant data indicative of raw data that is stored in nodes other than said each node, each node including a detection routine which detects system functional state which may prevent any operation of the network system;

communicating data between the nodes with a plurality of switching devices, connected to the communication devices in a way such that each of the communication devices in any one node is connected to a different one of the switching devices, allowing each of the nodes to communicate to each other of the nodes over one of at least two different paths, thereby providing redundant communication; and performing a distributed read comprising the steps of
determining a parameter related to availability of nodes, and reading said raw data from said plurality of nodes if said parameter indicates availability, and reading both said raw data and said redundant data from less than said plurality of nodes if said parameter indicates less than availability.

* * * * *

UNITED STATES PATENT AND TRADEMARK OFFICE
CERTIFICATE OF CORRECTION

PATENT NO. : 6,088,330
DATED : July 11, 2000
INVENTOR(S) : Bruck et al.

It is certified that error appears in the above-identified patent and that said Letters Patent is hereby corrected as shown below:

Title page,
Related U.S. Application Data,
Item [63], please delete "Continuation of application No. 08/926,624, Sep. 9, 1997, abandoned."

DRAWINGS,
In Drawing Sheet 6, Fig. 9, in the legend please replace "ncp" with -- nop --.

Column 1,
Please delete lines 4 and 5;
Between the TITLE and BACKGROUND sections, please insert the following:
-- STATEMENT REGARDING FEDERALLY SPONSORED RESEARCH OR DEVELOPMENT
The invention described herein was made in the performance of work under a NASA contract, and is subject to the provisions of Public Law 96-517 (35 U.S.C. §202) in which the Contractor has elected to retain title. --

Column 9,
Lines 35 -40, please replace
$$"\begin{cases} (n-1)-x \equiv j-1 \bmod n \\ (n-1)-x \equiv j-1 \bmod n \end{cases}"$$
with
$$--\begin{cases} (n-1)-x \equiv j-1 \bmod n \\ (n-2)-x \equiv y-i \bmod n. \end{cases}--$$

Please replace claims 1 and 21 with the following:
1. A redundant distributed network system, comprising:
a plurality of system nodes, each of said system nodes including at least two communication devices and a storage device, said storage device including redundant storage information for the network to permit reconstruction of stored data from the storage information in any one node when combined with data in any other node;
a plurality of switching devices, connected to said communication devices of said system nodes in a way such that each of said communication devices in any one system node is connected to a different one of said switching devices, allowing each of said system nodes to communicate to each other of said system nodes over one of at least two different paths, thereby providing redundant communication;
a detection routine at each node which detects system functional states which may prevent any operation of the network system; and

UNITED STATES PATENT AND TRADEMARK OFFICE
CERTIFICATE OF CORRECTION

PATENT NO. : 6,088,330
DATED : July 11, 2000
INVENTOR(S) : Bruck et al.

It is certified that error appears in the above-identified patent and that said Letters Patent is hereby corrected as shown below:

a logical network process which reconfigures the network using one of at least said communication device redundancy and said storage information redundancy as needed to compensate for the system functional state using the network redundancy.

21. A redundant distributed server, comprising:

an array of distributed computing nodes, each of said computing nodes having different stored information than each other node, and said stored information being redundant among said computing nodes to permit reconstruction of stored data from the stored information in any one node when combined with data in any other node;

a switching system, connected to said array of computing nodes, and providing redundant communication paths among said array of computing nodes, operating such that any specified number of network faults will not affect the operation of the remaining nodes of the system, each of said computing nodes running the same protocol to determine network status, such that each said computing node will see the same network history, and each said computing node including a detection routine that detects a system functional state that may prevent operation of the network system.

Signed and Sealed this

Eighth Day of January, 2002

*Attest:*

JAMES E. ROGAN
*Attesting Officer*

*Director of the United States Patent and Trademark Office*